Figure 19:
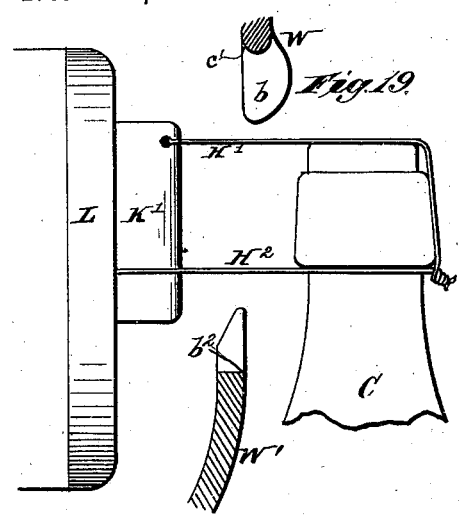

(No Model.) 5 Sheets—Sheet 1.
F. G. RILEY.
MACHINE FOR WIRING CORKS IN BOTTLES.
No. 351,714. Patented Oct. 26, 1886.
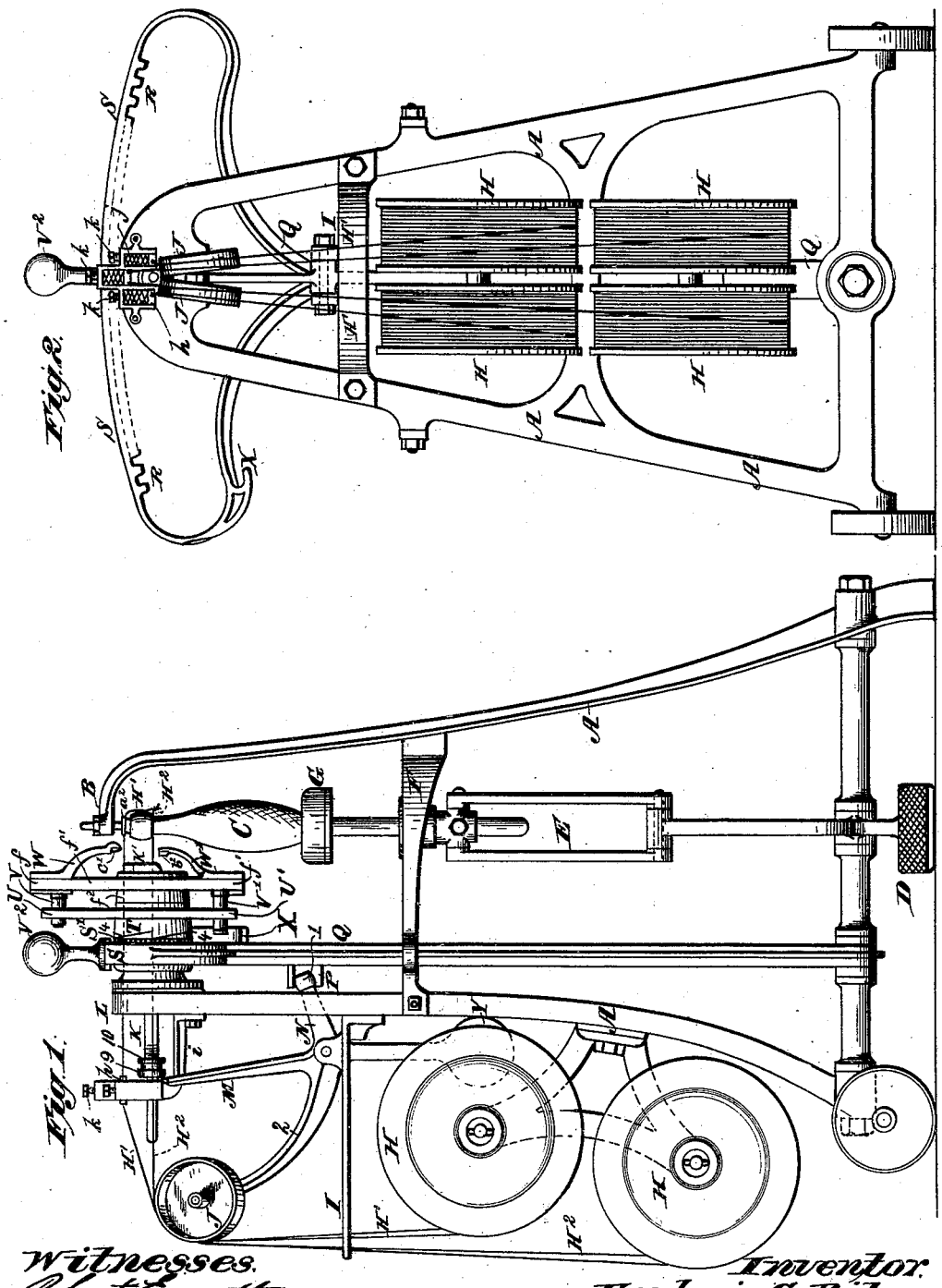
Witnesses
Robert Everitt
J. A. Rutherford
Inventor
Frederic G. Riley
By James L. Norris
Atty.

(No Model.)  5 Sheets—Sheet 2.
F. G. RILEY.
MACHINE FOR WIRING CORKS IN BOTTLES.
No. 351,714. Patented Oct. 26, 1886.
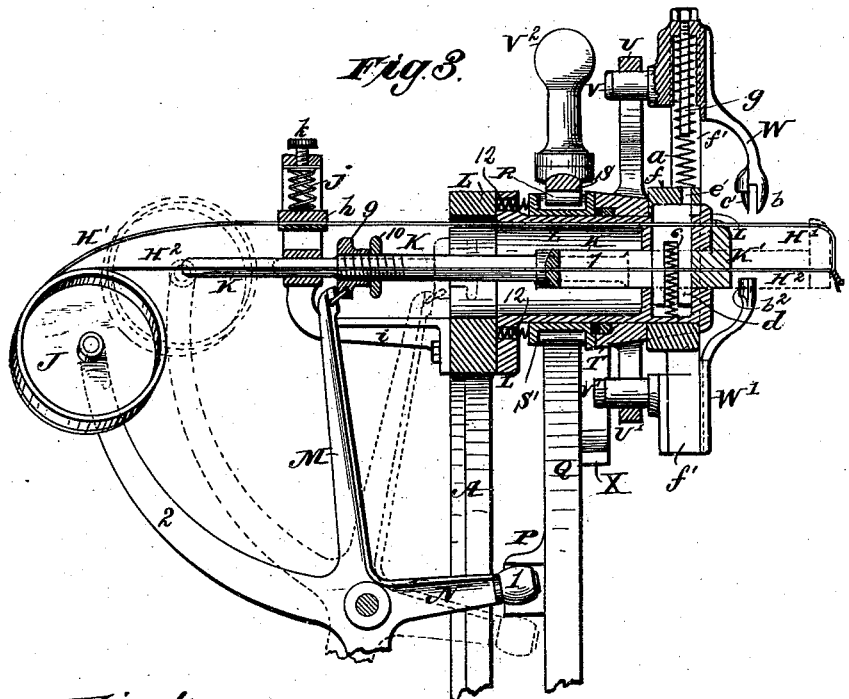
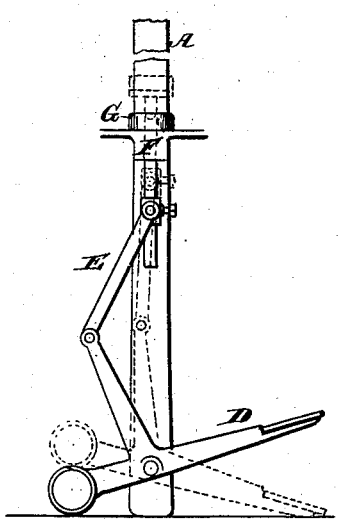
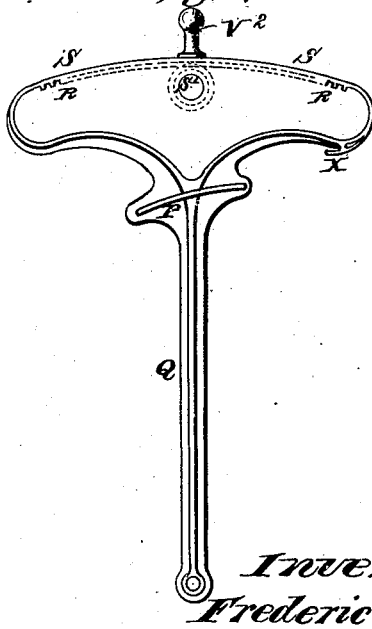
Witnesses.
Robert Everett.
J. A. Rutherford.
Inventor.
Frederic G. Riley.
By James L. Norris.
Atty.

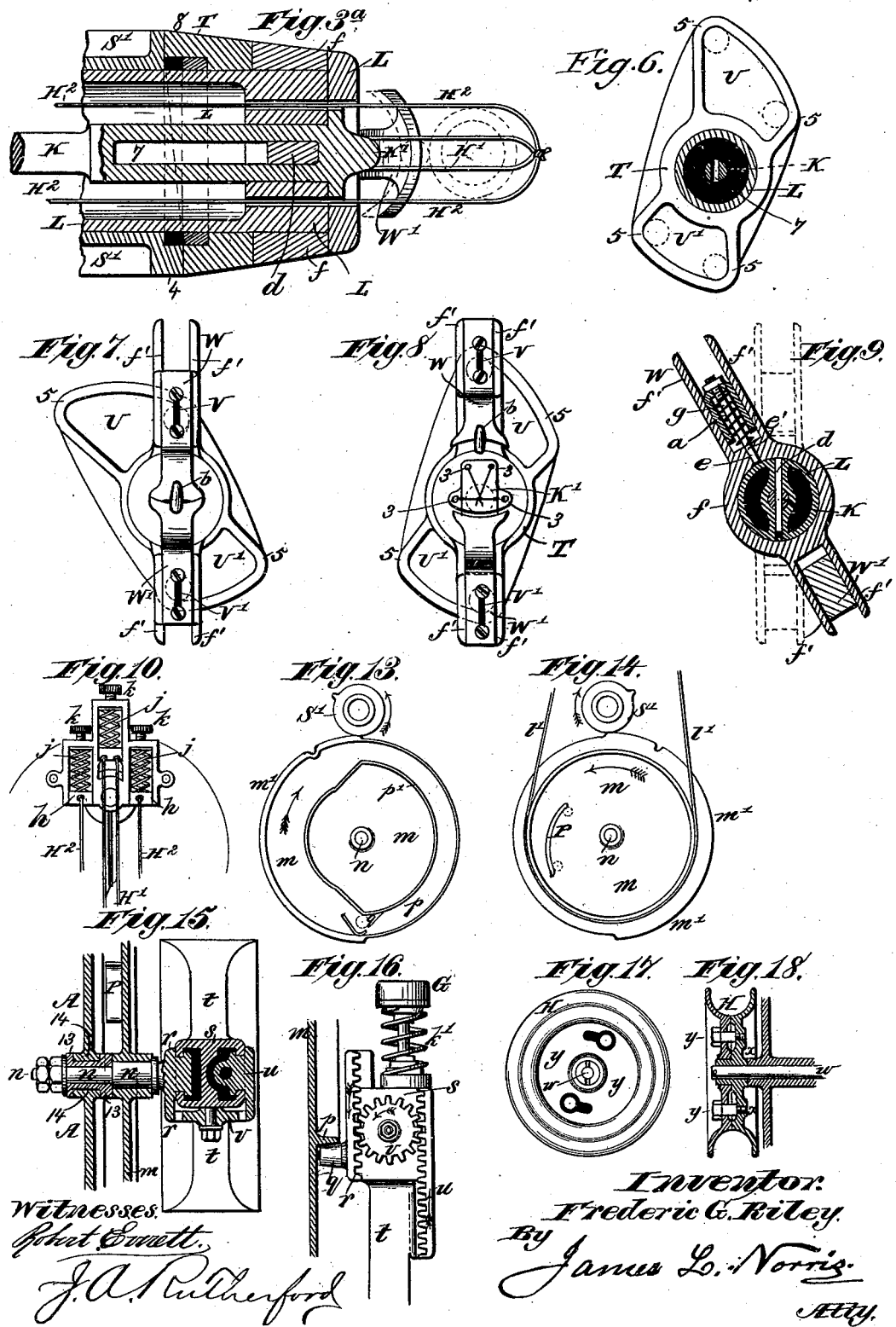

(No Model.)  5 Sheets—Sheet 4.
F. G. RILEY.
MACHINE FOR WIRING CORKS IN BOTTLES.
No. 351,714.  Patented Oct. 26, 1886.
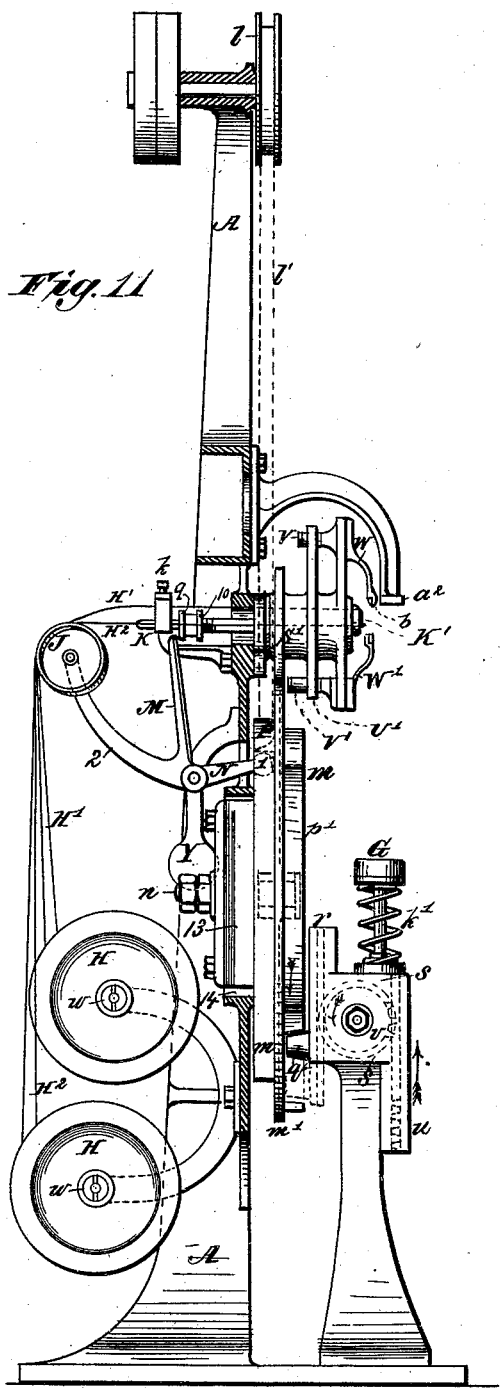
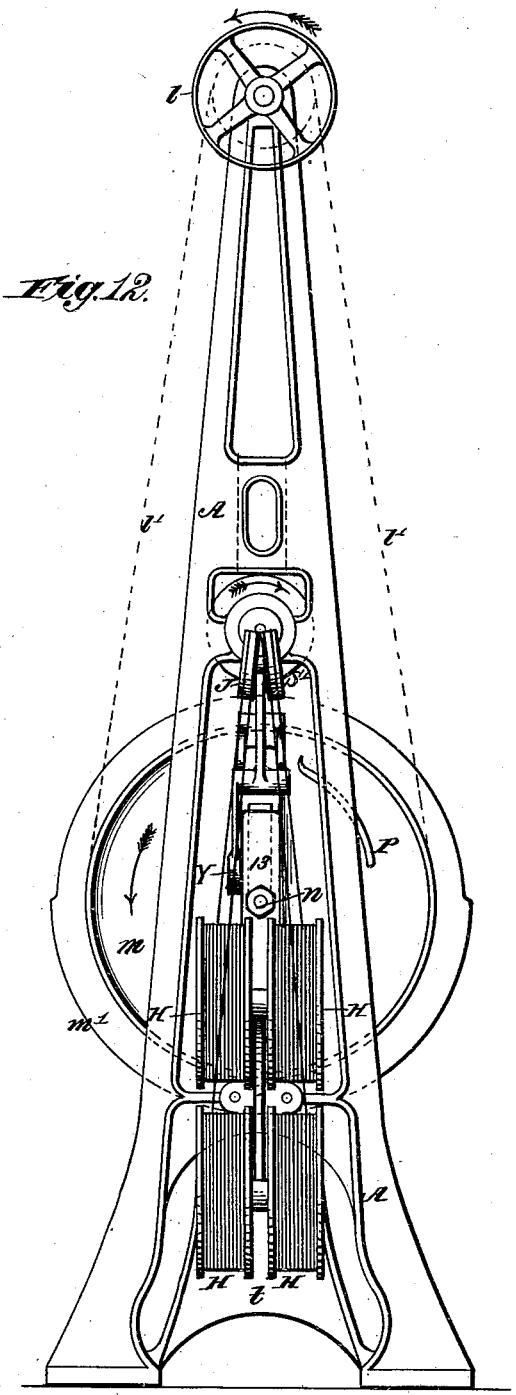
Witnesses.  Inventor
Frederic G. Riley,
By James L. Norris.
Atty.

(No Model.) 5 Sheets—Sheet 5.

F. G. RILEY.
MACHINE FOR WIRING CORKS IN BOTTLES.

No. 351,714. Patented Oct. 26, 1886.

Witnesses.
Robert Everett
J. A. Rutherford

Inventor:
Frederic G. Riley,
By James L. Norris.
Atty.

N. PETERS, Photo-Lithographer, Washington, D. C.

United States Patent Office.

FREDERIC GEORGE RILEY, OF LONDON, ENGLAND.

MACHINE FOR WIRING CORKS IN BOTTLES.

SPECIFICATION forming part of Letters Patent No. 351,714, dated October 26, 1886.

Application filed December 27, 1884. Serial No. 151,356. (No model.) Patented in Eng'and June 18, 1883, No. 3,018.

*To all whom it may concern:*

Be it known that I, FREDERIC GEORGE RILEY, a subject of the Queen of Great Britain, residing in London, England, have invented certain new and useful Improvements in Machines for Wiring Corks in Bottles, (for which I have obtained a patent in Great Britain, No. 3,018, dated June 18, 1883,) of which the following is a specification.

This invention has for its object to provide novel mechanism for securing corks in bottles by means of wire, and for automatically feeding, gathering, twisting, and severing the wire, whereby the ends thereof are left in position to secure the cork of the next bottle, and so on in succession.

The objects of my invention I accomplish in the manner and by the combination of devices hereinafter described and claimed, reference being had to the accompanying drawings, in which—

Figure 1 is a side elevation of a machine embodying my invention. Fig. 2 is a rear end view of the same; Fig. 3, a detail sectional view, on an enlarged scale, of a part of the upper end of the machine; Fig. $3^a$, a detail horizontal sectional view of the head of the machine containing the feed or pusher head; Fig. 4, a detail side view of the treadle mechanism for raising the bottle-support; Fig. 5, a detail elevation of the traversing lever; Figs. 6, 7, and 8, detail views of the cams on the sleeve of the head of the machine, the two last-mentioned figures showing the compression-arms; Fig. 9, a detail sectional view of a part of the head of the machine and the compressor-arms, showing the bolt for locking the said arms; Fig. 10, a detail view of the tension devices for regulating the feed of the wires; Fig. 11, a side elevation showing a modification of the machine; Fig. 12, a rear end view thereof; Figs. 13 to 18, inclusive, detail views of parts embodied in the modified form of machine shown in Figs. 11 and 12; Figs. 19 to 24, detail views, hereinafter explained, showing the various positions of the compressor-arms.

In order to enable those skilled in the art to make and use my invention, I will now describe the same in detail, reference being had to the drawings, where—

The letters A A indicate the frame of the machine, having at its front upper end a lateral projection, B, forming an abutment against which the cork of the bottle C bears under the pressure of the foot-lever D, through the link E and guide F, as in Figs. 1 and 4, the bottle resting upon the bottle support or block G.

The letters H H indicate reels or drums (preferably four in number) on which the wires are wound, said wires being led through an orifice in a stationary plate, I, and over guide-rollers J J to the feeding appliance or pusher-head K'. The stem K of the pusher-head has a reciprocating action within the fixed head L of the machine by means of the vibratory lever M, the short arm N of which carries a friction-roller, 1, capable of being depressed by the cam-plate P, on a transverse traversing arm, Q, the latter being moved or drawn over toward the operator by the handle $V^2$. The guide-rollers J J are on a branch, 2, of the lever M, and move with it, sufficient wire being taken from the reels H H to serve for wiring a bottle. The face of the pusher-head K' has, say, four holes, 3, (see Figs. 8 and 20,) two for wires H' H' at a higher level and closer together than those of the two holes for the wires $H^2 H^2$, so that the wires H' are above the cork and the wires $H^2$ below or under the shoulder of the mouth of the bottle, as seen in Fig. 1. The traversing arm Q has teeth R on the inner face of its bow or arched part S, which teeth are in gear with a pinion, S', loosely mounted on the fixed head L. The pinion S' has a boss provided with clutch-teeth 4, Fig. 1, on its outer face to engage with corresponding teeth 8, Fig. $3^a$, on a sleeve, T, so as to impart rotation thereto when moving in one direction only, and to slip over on the return motion. The sleeve T is provided with two cams, U U', (shown separately in Figs. 6, 7, and 8,) in the races of which rollers or studs V V', on compression-arms W W', are caused to approach each other for, say, the forward movement of the arm Q, but are returned to their normal position by springs *a a*.

The compression of the arms W W' gathers the four wires H' H' $H^2 H^2$ into a cluster, but not so that all the four wires will be in actual contact, the upper and lower wires of one side of the bottle neck and cork being alone brought together by the compression, the separation of the two pairs being insured by a pointed end, *b*, of the upper arm, W, entering between the two pairs of wires at that side, so that a twist shall take place of the four wires on each face of it, a loop being formed between said two twists by reason of the greater travel of the pointed upper arm, W, the cam-race U for this arm having a greater arc than that for the other compressor-arm. The double cam U U' is shown in the detail views, Figs. 7 and 8, the compressor being shown in a closed and in an open position, respectively. The opening action of the compressors is effected by springs $a\ a$, which keep the rollers or studs V V' in contact with the cams U U', the races of which terminate in abutments 5, so that when the cams are rotated under the action of the clutched sleeve T, the arms W W' rotate therewith, and not only insure the gathering of the wires H' H' H$^2$ H$^2$, but the twisting of them, as before explained.

In the fixed head L is arranged a rectangular bolt or locking-plate, $d$, Figs. 3, 3$^a$, and 9, which is partly cut away at its lower end, Fig. 3, to receive a spring, 6, by which said bolt is forced outward and made to engage in a recess, $e$, in a collar, $f$, which carries guides $f'$ for the compressor-arms, thereby locking said arms from rotation during such time as the cams are compressing them for the gathering operation, and as this is completed a push-pin, $g$, carried by the arm W, enters the recess $e$ through an opening, $e'$, Fig. 3, so as to press upon the bolt $d$ and force it back within the head L, to allow the arms W W' to take up the motion of the cams and effect the twisting operation, which takes place between the fixed head and the neck of the bottle. It will be observed that the push-pin $g$, as shown in Figs. 3 and 9, may also serve as a support for one of the springs $a$ that return the studs V V' to their normal position after the forward movement of the arm Q, as before explained. In order to permit the passage of the bolt $d$ without interfering with the reciprocation of the stem K, said stem is provided with an elongated longitudinal slot, 7, as shown in Figs. 3 and 3$^a$.

The traversing lever Q has sufficient teeth to give the cams U U' the necessary stroke to first shape the wires H' H' H$^2$ H$^2$ to one center and then to give two complete revolutions to form the twisted loop between the neck of the bottle C and the sliding pusher-head K'. Just at the termination of its stroke the projecting roller or stud V' of the gathering-tool W', which is prolonged through the cam-plate U' for this purpose, is struck by the projection X of the traversing arm Q, thus causing the arm W' to take a further stroke nearer the center and sever the wires by bringing the two portions $b^2$ and $c'$ of the arms W W' forcibly together. The traversing lever Q, having now completed its stroke, has brought the arms W W' around to their first position, with the hole $e$ directly opposite to the bolt $d$ in the fixed head L, into which hole the bolt shoots and locks the arms W W', after which the gathering tools open out under the action of their springs $a\ a$ and bring the double cam-plate U U' to its first position. The traversing lever Q is now returned or thrown back, and in doing so its cam-plate P, through the lever M N, causes the sliding or pusher head K' to be forced outward, as in dotted lines, and to take the twisted end of the four wires H' H' H$^2$ H$^2$ with it into position, as shown in Figs. 3 and 3$^a$. After the traversing lever Q has traveled back a certain distance, the lever N escapes from the cam P, and the counter-balance weight Y returns the sliding head or feeder K' into contact with the fixed head L, leaving the wires projecting as a sort of cage, as at Fig. 3, into which the cork of the next bottle can enter and be wired by the gatherers, as before explained. The tension-plates $h\ h$ are carried by a bracket, $i$, attached to the frame A of the machine, and they are governed by springs $j\ j$ and adjusting-screws $k\ k$. The wires H' H' H$^2$ H$^2$ pass between these plates $h\ h$, as at Figs. 1, 3, and 10, which regulate the feed of the wires and prevent the slackness of the same, the reels or drums H H being free.

The lever M may be connected with the pusher rod or stem K in any convenient manner. As shown in Figs. 1 and 3, a portion of the rod or stem K is screw-threaded for attachment of an adjustable collar, 9, that is held in place by a jam-nut, 10, and connected by a link or other fastening, 11, to the upper end of the lever M, which bears against one end of said collar. The movements of the lever M, under the action of the traversing lever Q and counter-balance Y, are thus communicated to the rod or stem K so as to cause the pusher-head K' to reciprocate, as required. To hold the clutch-teeth 4 and 8 of the pinion S' and sleeve T in yielding contact, so that they will engage when the lever Q is thrown forward and disengage during its backward movement, springs 12 are arranged in recesses in the fixed head L to bear on the opposite face of the pinion.

The machine thus described is to be worked by hand, but by certain modifications the rotating head and parts adjacent can be worked by power and be made to act intermittingly from a band-wheel, $l$, as shown in Figs. 11 and 12, where $m$ indicates a half-friction and half-slip disk (shown detached in Figs. 13 and 14) mounted loosely on an axle-pin, $n$. The disk $m$ has on one of its faces a cam-plate, P, for actuating the short arm N of the lever M for moving the sliding head K', and within the other face of the disk $m$ is a cam-race, $p$, in which a stud, $q$, (see Fig. 16,) is actuated, as hereinafter described. The stud $q$ is on the back of a rack, $r$, which rack can slide up and down in the head $s$ of the supporting-pillar $t$, (see Fig. 16,) said rack being operated in one direction—viz., upward—by the depression of the platform or bottle-holder G when a bottle is placed in position on it, the platform or bottle-holder being then forced downward, whereby the rack $u$ on its lower end causes the pinion $v$ to rotate and the other rack, r, to be raised, and with it the stud q. The disk m, which is supported by the pin u, has its rim p' in the path of and is acted upon by the stud q, so that as the latter rises the disk m also rises to place its friction-rim m' in frictional contact with the wheel S', thereby operating the cams U U' in a manner similar to the spur-pinion S', described with reference to Figs. 2 and 3. The cork of the bottle abuts against the stop a², and should the bottle not be removed by hand the sliding head K', when next pushed out by the lever M, will knock the bottle away, and the spring k', with which the support G is provided, will force it and the rack u upward, which motion, through the pinion v, will cause the rack r to descend and the disk m to stop, taking the friction-rim m' out of contact with the small wheel S'. Thus the disk m may keep on revolving without touching the small wheel S' until another bottle is placed in position; but in this continued rotation of the disk m the head K' will not be operated, by reason of the cam P temporarily leaving and ceasing to act on the short arm N of the lever M. This drop of the disk allows the driving-band l' to be slightly tightened thereby. In order to allow the required vertical movement of the disk m, its axle or supporting-pin u is journaled in a movable bearing-block, 13, that is capable of sliding vertically in a guideway, 14, formed in the machine-frame, as shown in Figs. 11, 12, and 15.

I purpose using bundles of wire from the wire-drawers, and instead of untying the bundles and then winding them upon a reel I place a bundle direct upon a half-pulley, x, and then place the other half-pulley, y, upon it and bolt the two half-pulleys together, as at Figs. 17 and 18, the bundle being still intact. I then mount the pulley upon its axle-pin w and sever the binding wires or string, and use the wire direct for securing corks in bottle-necks.

Figure 20:
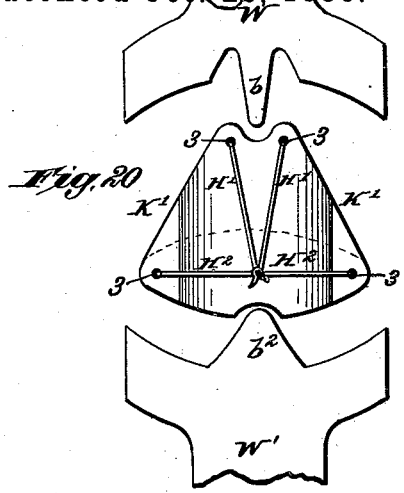
Figure 21:
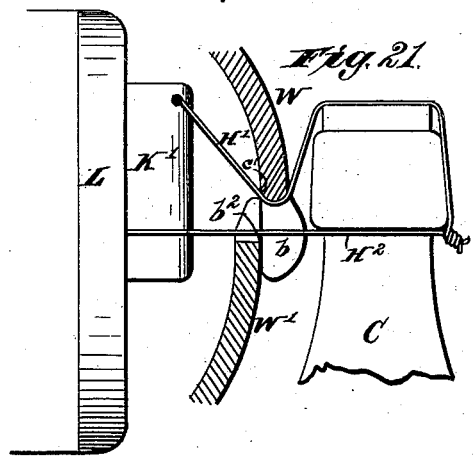
Figure 22:
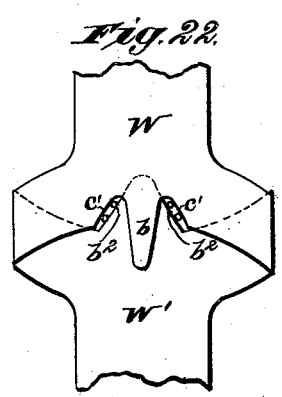
Figure 23:
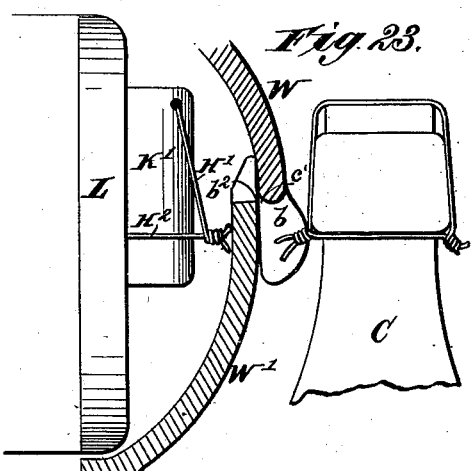
Figure 24:
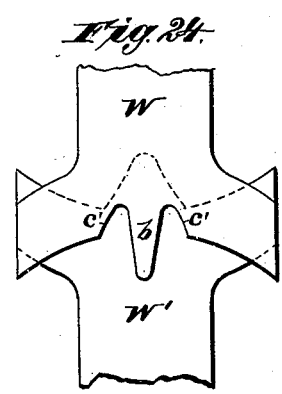

Instead of one pointed end, b, being caused to enter between the wires, the lower arm, W', may have a pointed end, as at Figs. 19 and 20, arranged so that both pointed ends enter between the wires, as at Figs. 21 and 22, each point passing the other, so as to jam the wires in the two angled surfaces b² b² c' c', to hold them firmly while the twisting takes place. The severing of the wires is then effected by a combined cutting and twisting separation of said wires as the pointed ends b b pass each other into the position shown at Figs. 23 and 24.

Having thus described my invention, what I claim is—

1. The combination, in a machine for wiring corks in bottles, of a vertically-movable bottle-support, a supporting-frame having an abutment for the cork to bear against, a horizontally-moving pusher-head, radially-movable and rotating compression-arms for gathering and twisting the wires, and cams for compressing said arms, substantially as described.

2. The combination, in a machine for wiring corks in bottles, of a vertically-movable bottle-support, a supporting-frame having an abutment for the cork to bear against, a stationary tubular head, a rotating sleeve on said head, a double cam carried by the sleeve, compressor-arms moved radially and rotated by the cams, and a reciprocating pusher-head in the tubular head, substantially as described.

3. The combination, in a machine for wiring corks in bottles, of a supporting-frame, wire-reels carried thereon, a tubular head, a reciprocating pusher-head in said tubular head, radially movable and rotating compressor-arms for gathering, twisting, and severing the wires, and mechanism for actuating the parts, substantially as described.

4. The combination, in a machine for wiring corks in bottles, of a supporting-frame having a stationary tubular head, a bottle-support, wire-reels carried by the frame, a sliding pusher-head in the tubular head, an oscillating lever carrying guide-rollers and connected with the pusher-head, and rotating and radially-movable compressor-arms for gathering, twisting, and severing the wires, substantially as described.

5. The combination, in a machine for wiring corks in bottles, of a tubular head, wire-reels, the wires of which extend through said head, a reciprocating pusher-head in the tubular head, compressor-arms carried by the tubular head, and means for radially moving and rotating the arms to gather, twist, and sever the wires, substantially as described.

6. The combination, in a machine for wiring corks in bottles, of a supporting-frame having a tubular head through which the wires extend, a sliding pusher located in said tubular head, an oscillating lever carrying guides for the wire and connected with the pusher and provided with a short arm, means for acting on said short arm to oscillate the lever and move the pusher, and radially moving and rotating compressor-arms for gathering, twisting, and severing the wires, substantially as described.

7. The combination, in a machine for wiring corks in bottles, of a tubular head through which the wires extend, a reciprocating pusher in said head, and radially moving and rotating compressor-arms for gathering, twisting, and severing the wires, substantially as described.

8. The combination, in a machine for wiring corks in bottles, of a tubular head through which the wires extend, a reciprocating pusher in said head, a sleeve loose on the head and having a double cam, compressor-arms connected with the cams, a pinion on the tubular head clutched to the sleeve and a transverse traversing arm having a rack engaging the pinion to rotate the sleeve and cause the compressor-arms to move radially and rotate for gathering, twisting, and severing the wires, substantially as described.

9. The combination, in a machine for wiring corks in bottles, of compressor-arms W W', and rotating cams connected with said arms and acting to radially move and rotate them for gathering, twisting, and severing the cork-holding wires, substantially as described.

10. The combination, in a machine for wiring corks in bottles, of the tubular head having two pairs of holes, the upper pair being nearer together than the lower pair, the wires passing through said holes to form an open cage for receiving the cork, and radially moving and rotating compressor-arms for gathering and twisting the wires, substantially as described.

FREDERIC GEORGE RILEY.

Witnesses:
HENRI TAVARGER,
75 *Turnmill Street, London, England.*
CHARLES REYNOLDS RILEY,
*Elm Tree Lodge, South Lambeth Road, London, England.*